May 29, 1945. H. PFLEUMER 2,377,177
REFLECTIVE VULCANIZING CHAMBER
Filed Sept. 8, 1941 3 Sheets-Sheet 1

INVENTOR.
Hans Pfleumer
BY Samuel Ostrolenk
ATTORNEY

May 29, 1945.  H. PFLEUMER  2,377,177
REFLECTIVE VULCANIZING CHAMBER
Filed Sept. 8, 1941   3 Sheets-Sheet 3

INVENTOR.
Hans Pfleumer
BY
ATTORNEY

Patented May 29, 1945

2,377,177

UNITED STATES PATENT OFFICE 2,377,177

REFLECTIVE VULCANIZING CHAMBER

Hans Pfleumer, New Brunswick, N. J., assignor to Rubatex Products, Inc., New York, N. Y., a corporation of Delaware Application September 8, 1941, Serial No. 410,062

5 Claims. (Cl. 18—7)

My invention relates in general to vulcanizing apparatus and more particularly concerns an autoclave adaptable to the manufacture of gas expanded rubber products.

Gas expanded rubber is the product obtained by first introducing a quantity of partially cured rubber into an enclosure which contains means for introducing high pressure gases therein and means for heating the rubber.

The introduction of high pressure gas into the autoclave results in the homogeneous occlusion of minute quantities of gas within the partially cured rubber. Heat is then introduced into the autoclave to completely vulcanize the gas impregnated rubber and immediately thereafter the gas pressure within the chamber is gradually lowered. The reduction of pressure within the chamber is accompanied by the expansion of the occluded gases and the resulting product is gas expanded rubber having a comparatively low density and comprising a structure of homogeneous sealed rubber cells.

The gas employed to expand the rubber within the autoclave is preferably nitrogen and the working pressures are of the order of 5000 pounds per square inch. Obviously, in order to withstand these tremendous pressures imposed, the autoclave must be of a high strength material and have extremely thick walls.

For example, if a high strength chrome molybdenum steel alloy is utilized to form a cylindrical gassing chamber having an inside diameter of the order of ten inches, the autoclave will require a wall thickness of the order of 1¼ inches, in order to safely withstand the pressures required for the gassing of cellular rubber.

This type of cylindrical gassing chamber may be fabricated from seamless steel tubing of the metal described.

However, when it is desirable to manufacture a gassing chamber of considerably larger dimensions in order that the amount of rubber gassed during a single cycle may be increased it is necessary to employ a laminar construction in order to build up the necessary wall thickness.

Accordingly, if a 20" inside diameter autoclave is to be used, the wall thickness when formed from relatively thin sheet steel rolled to the proper cylindrical shape will be of the order of four inches.

It is immediately apparent that with a wall thickness of four inches, heating of the interior cannot be accomplished by an externally applied heating element. As is well-known in the art of gas expanded rubber, it has been necessary to utilize heating coils within the autoclave to effect the desired temperature control of the interior. Thus a layer of copper tubing or the like would be placed along the inner wall of the autoclave and steam of the proper pressure would be caused to flow through these coils to obtain the necessary heating.

One of the principal difficulties heretofore encountered in the manufacture of cell tight expanded rubber by a gassing process has been that a considerable quantity of heat would normally be required to heat the walls of the autoclave in order that the interior of the chamber be brought up to the proper vulcanizing temperature.

As an example consider the aforementioned autoclave; namely, a cylindrical member having a wall thickness of four inches and an outside diameter of 20 inches. For a gassing chamber 20 feet long, therefore, there will be approximately 42 cubic feet of metal which must necessarily be heated if the temperature within the autoclave is to be raised.

The excellent heat conductive properties of metal, which because of its high tensile strength is necessarily employed for the cylindrical walls, has thus resulted in a loss of heat and necessarily a loss in time since the time required to elevate the temperature of the interior of the vulcanizer is necessarily dependent upon the rate at which heat is absorbed by the enclosing walls.

A further disadvantage encountered in the manufacture of cell tight rubber within a gassing chamber of the dimensions described was that due to the high rate of absorption of heat by the chamber walls, the temperature within the autoclave would rise gradually after the introduction of high pressure steam into the heating coils. This gradual rise from room temperature to the required vulcanizing temperature would make the prediction of the exact vulcanizing time required an impossibility.

Thus the gas expanded rubber manufactured during this cycle would differ considerably as a result of different vulcanizing periods. My invention contemplates the elimination of the aforementioned difficulties heretofore encountered in the manufacture of gas expanded cellular rubber by utilization of a novel and improved form of vulcanizing chamber.

Thus in accordance with my invention, the heat distribution within the vulcanizing chamber is more uniform and the vulcanizing temperature required is attained in a shorter period of time than has theretofore been known. I utilize means within the gassing chamber for directing the heating energy introduced by the heating coils towards the interior of the vulcanizing chamber and means for minimizing the heat absorbed by the metallic structure thereof.

In accordance with the principles of my invention, I surface the inner wall of the vulcanizing vessel with a substance which reflects a greater portion of impinged infrared radiation and I surface those portions of the heating elements which face the interior of the chamber with a highly emissive substance.

Accordingly, heat introduced to the interior of the chamber will be directed towards the rubber compound contained therein to effect a rapid vulcanization thereof.

It is, therefore, an object of my present invention to provide a vulcanizing chamber which minimizes the time required for the processing of rubber introduced therein.

Another object of my invention is to provide a gassing chamber for the fabrication of expanded rubber which contains means for directing all heat introduced therein towards the interior of the chamber.

Still another object of my invention is to provide a gassing chamber having an inner surface of reflective material so that heat is concentrated within the gassing chamber whereby a shorter vulcanizing cycle and a more uniform product is obtained.

A further object of my invention is to provide a gassing chamber having a plurality of heating coils disposed along the inner surface thereof and having a high radiating characteristic towards the center of the chamber and a low radiating characteristic towards the chamber walls.

These and other objects of my invention will now become apparent from the following specification taken in connection with the accompanying drawings in which.

Figure 1:
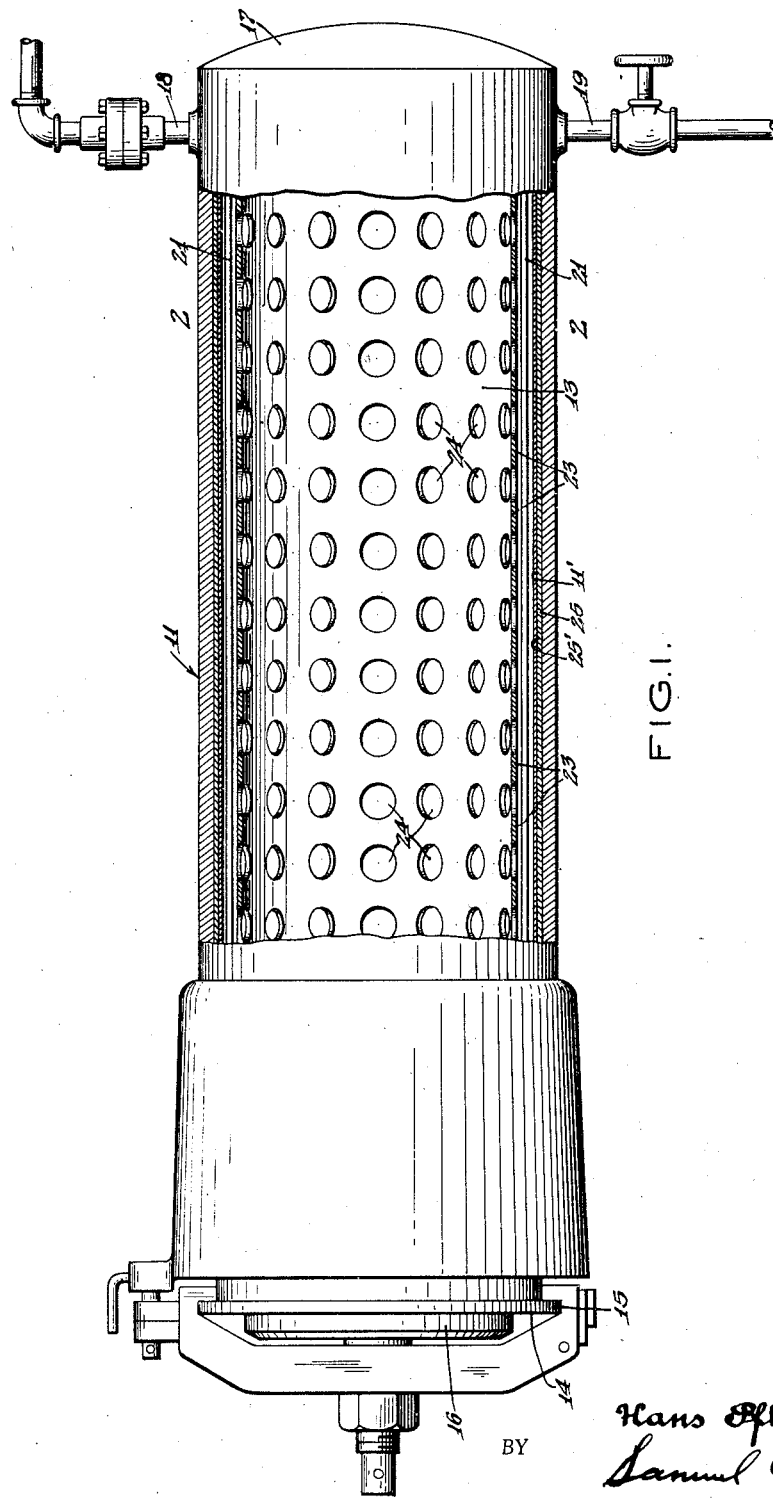
Figure 1 is a cross sectional view of a cylindrical gassing chamber and illustrating the relative position of the heating coils and chamber walls.
Figure 2:
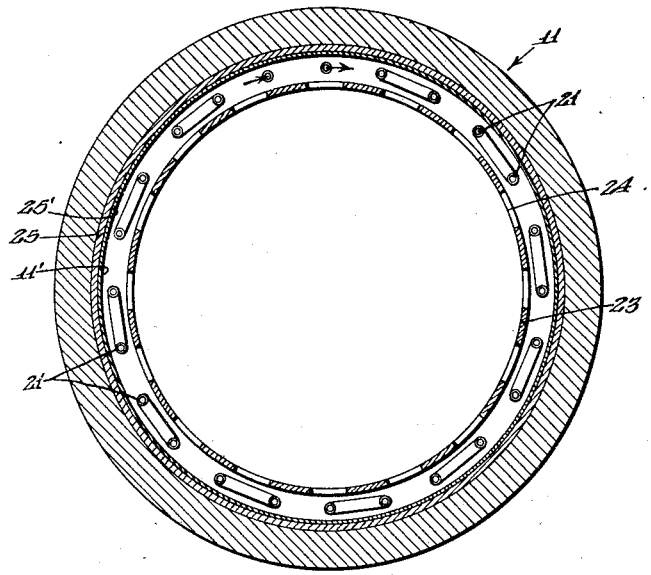
Figure 2 is a cross sectional view of the gassing chamber taken along the line 2—2 of Figure 1 and illustrates several modifications of the internal construction thereof.
Figure 3:
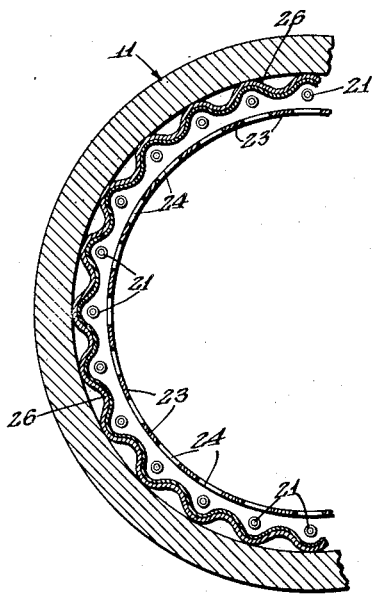
Figure 3 is a cross sectional view of a gassing chamber taken normal to the axis thereof and illustrates another modification of the internal construction thereof.

As previously mentioned, in the fabrication of gas expanded rubber, it is necessary to utilize an enclosure for withstanding high pressures. This is accomplished as illustrated in Figures 1, 2 and 3, by a thick walled autoclave.

The autoclave is formed by generating the cylindrical part by coiling a single steel sheet into a roll of the desired wall thickness and welding the inner and outer edges towards the inner and outer surfaces to prevent gas leaks. The ends are, after being faced true, welded to a heavy solid steel ring at one end and a closure block at the other end.

Thus the wall thickness of the autoclave 11 is relatively great and the volume of metal utilized to form the enclosing walls is of the order of the internal chamber 13 into which the rubber is introduced. The open end 14 of the autoclave 11 is provided with a flange 15 to which a closure 16 may be removably secured in any convenient manner for instance in the manner shown in my applications Serial Nos. 204,482, now Patent No. 2,258,804, and 285,052, now Patent No. 2,335,309.

The closure 16 is obviously of the same thickness as the walls of the autoclave 11. Hydraulic means may be employed to maintain the closure 16 in engagement with the flange 15 during the gassing process and suitable gaskets may be employed to prevent leakage at the seal. Or clamping means may be used as described in the aforesaid applications. The closed end may have a suitable permanently affixed closure 17 with suitable inlets 18 and 19 for gas and steam respectively.

The closures being of great strength and weight and not being heated as the rest of the cylindrical surface will absorb a great amount of internal heat, continuously radiating it towards the outside atmosphere so that the terminations of the interior volume of heated compressed gas are constantly at a lower temperature and consequently impress this irregularity upon the rubber being treated.

Disposed adjacent the chamber wall 11 are a plurality of heating coils 21 which may comprise a continuous length of tubing bent to form a cylindrical structure of tubes such as that illustrated in Figure 2. The heating coils 21 are spaced relatively close to each other so that the rate of heat transfer to the interior of the chamber is as great as possible.

The ends of the heating coils may be led from the chamber through any suitable seal to a source of high pressure live steam 19. The coils 21 may in certain cases be made for inspection and repair through the open end 14 of the cylinder 11.

A protective shield 23 as illustrated in Figures 1, 2 and 3 is employed within the gassing chamber to preclude damage to the heating coils 21 by the rubber products introduced into the chamber.

In order, however, that the rate of heat transfer to the interior remain relatively great, the shield 23 contains a plurality of uniformly distributed perforations 24. The high pressure gas is introduced into the chamber through suitable piping 18 which enters through a seal that precludes gas leakage.

Thus in the fabrication of sealed cell gas expanded rubber, the closure 16 is removed and the required quantity of partially cured rubber is introduced into the chamber 13.

The closure 16 is then securely fastened to the autoclave 11 in the manner described in the applications aforesaid so that a leak proof seal is effected.

High pressure nitrogen gas is then introduced through the gas inlet and pressure thereof is raised to approximately 3500 pounds per square inch.

At this point live steam is introduced into the coils 21 disposed along the interior of the chamber wall so that the temperature of the autoclave rises. This increase in temperature is, of course, accompanied by a corresponding increase in pressure and at vulcanizing temperature the pressure within the autoclave is of the order of 5000 pounds per square inch.

As a result of the heat conductive properties of the thick metallic chamber wall of a conventional type autoclave, much of the time expended in the operation is taken by the heating and cooling of the chamber wall; indeed, for a five hour cycle, only about two hours is used for actual operation on the rubber.

To improve the thermal efficiency of the gassing cycle for a given quantity of rubber, it is desirable to shorten the time for heating and cooling the chamber itself.

This, of course, results in a heat cycle which is primarily devoted to the vulcanization of the mix within the chamber.

I have discovered that I may greatly reduce the gassing cycle of a given charge of rubber by concentrating the heat introduced through the tubing 21 towards the interior of the chamber 13. I accomplish this as illustrated most clearly in Figures 2 and 3, by surfacing all objects within the autoclave 11 so that the heat introduced is directed towards the center of the chamber.

It is evident from the symmetrical construction of the gassing chamber that the heat transfer within the chamber is primarily accomplished by conduction from the heat coils 21 through the compressed gas within the chamber 13 to the rubber mix contained therein; by radiation of infrared rays from the heating coils directly to the rubber, and that convection currents are not present.

The heat conductivity of a gas is comparatively low and hence it is necessary to rely principally upon direct radiation of the heat energy to the rubber for the vulcanization process. However, from a uniform body heat is radiated equally well in all directions, and thus if the tubing 21 is of copper, for example, the heat radiation in the direction of the cylinder wall will be as great as the heat radiation towards the center of the chamber 13.

In order to minimize the heat absorbed by the cylinder wall 11, I surface the interior thereof with a layer of high reflectivity, and thus a major portion of the heat will be directed towards the center of the chamber. If the cylinder wall 11 is formed from comparatively rough steel plate, it will normally have a relatively high coefficient of heat absorption and accordingly a relatively low coefficient of heat reflection.

On the other hand, bright metals such as silver, gold or aluminum have extremely low coefficients of heat absorption and thus high coefficients of heat reflectivity. For instance, it has been experimentally shown that a gold surface will absorb only five per cent of impinged infrared radiation and reflect of the order 95% thereof.

Thus, the inner surface 11' of the cylinder wall may be plated directly with a material such as silver or gold or silver or gold foil may be adhered thereto by suitable agents such as sodium silicate. This foil will, therefore, reduce the amount of heat absorbed by the heavy wall 11 and add this heat to the interior of the chamber 13.

Since the reflective surface within the vulcanizing vessel such as illustrated in Figures 1, 2 and 3 will ofen require cleaning and polishing, I prefer to introduce a sheet 25 into the space between the cylindrical wall 11 and the tubing 21. This sheet 25 may comprise a removable metallic plate or may comprise a sheet of heat insulating material such as asbestos or the like. The inner surface 25' of the sheet 25 may then be electroplated or otherwise surfaced with a layer of silver or gold in order to provide a heat reflective surface.

Gold is a preferable reflector since it is unaffected by the rubber compounds normally introduced into the chamber and may thus be easily polished. The sheet 25 may comprise a cylindrical member which is removable from the end 14 of the gassing chamber or may comprise sections which may be slipped in from the end 14 and may be removed therefrom in a similar manner.

In another form, the reflective sheet may be in the form of a corrugated metallic or heat insulating element 26, the inner surface of which is coated as previously described with a highly reflective metal such as gold.

Figure 4:
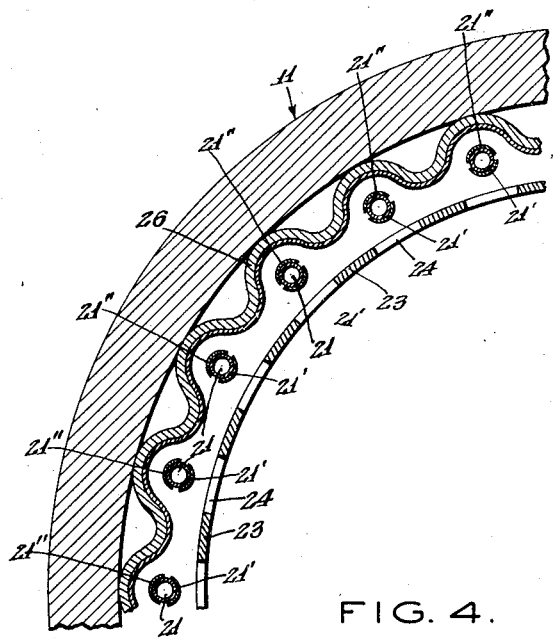
Figure 4 is an enlargement of a portion of Figure 3 showing the details thereof.

The corrugated sheet 26 illustrated in Figures 3 and 4 is particularly advantageous in that it is self supporting, that is, it automatically assumes a position between the inner surface of the cylinder 11 and the tubing 21. Furthermore, the use of a corrugated material such as 26, minimizes the contact between the reflective sheet and the inner wall 11' of the autoclave. This, of course, reduces the heat transfer therethrough by conduction.

The utilization of a reflective cylindrical member such as 25 (Figure 2) or 26 (Figures 3 and 4) greatly reduces the time required for the rubber within the autoclave to reach the necessary vulcanizing temperature. Furthermore, the concentration of heat within the interior of the chamber reflected by the reflective surface serves to uniformly distribute the heat within the chamber, and accordingly, the product obtained from such a gassing chamber is more uniformly vulcanized.

In connection with previous forms of gassing chambers, it was found that the distribution of heat within the autoclave was generally irregular and that the temperatures were greatest in the center of the chamber and dropped off rapidly towards the end closures such as 16 and 17 illustrated in Figure 1.

This results from the fact that the tubing 21 employed for introducing heat into the chamber cannot be placed adjacent the walls of the closure since it is necessary to introduce the partially cured rubber and remove the expanded rubber from the chamber from the ends thereof.

If the novel reflective surface illustrated in Figure 2 is also applied to the closure 16 of Figure 1, the distribution of heat becomes more nearly uniform throughout the chamber, and hence, it is possible to gas a considerably greater quantity of rubber during a single cycle than has heretofore been known.

Thus, in addition to reducing the time required to effect a single gassing cycle, the quantity of rubber produced is increased and accordingly, it is evident that the over all efficiency of the gassing cycle is greatly improved.

In order to further improve the efficiency of the heat transfer cycle within the autoclave 11, I make the individual heating coils 21 directive in their heat radiating properties. Thus, as illustrated in Figure 4, the autoclave comprises the cylindrical wall 11 and the tube 21. Interposed between the wall 11 and the tube 21 as previously described, a corrugated sheet of metal 26, such as aluminum, may be employed to concentrate heat impinged thereupon towards the center of the cylindrical chamber.

The tube 21, which is preferably of copper in order to obtain as rapid a heat transfer as possible, is treated so that the surfaces 21' which are directed towards the interior of the chamber 13, have a highly heat emissive property; whereas, the surfaces 21" directed towards the surrounding wall 11 have a highly reflective property.

This is readily accomplished by treating the copper coil in an electrolytic bath so that a silver layer is obtained upon the outer surface thereof. Immediately thereafter, the inner area 21' may be coated with a substance such as lamp black so that the finished outer surface is half reflective and half emissive since the final surface is the deciding factor. Thus, the introduction of live steam through the tubing 21 will cause heat radiation to be directed towards the interior of cylinder 13. That reduced portion of the heat which is not at first directed towards the interior 13 (by reason of the heating coil being made less emissive) but is radiated towards the wall 11, will strike the corrugated reflecting surface 26 and a major percentage of this heat will then be reflected towards the interior.

Figure 5:
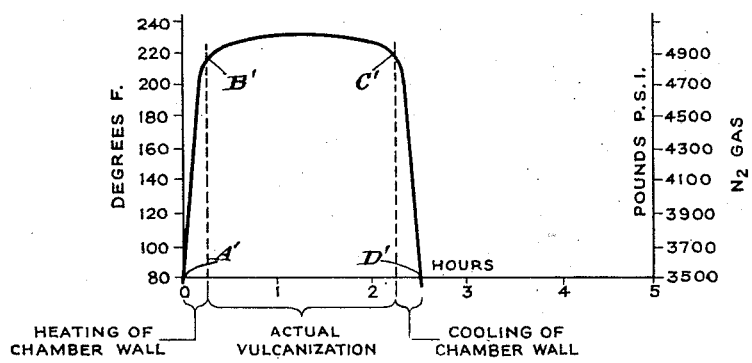
Figure 5 is a graphical representation of the heat and pressure cycles of the novel gassing chamber herein disclosed.

As a result, the heat cycle of the vulcanizer may be accomplished without appreciable heating of the cylinder wall 11. This is best illustrated in Figure 5 which is a graphical illustration of a heat cycle for my novel vulcanizer. Thus, at point A' the interior of the chamber is at room temperature and normal gassing pressures which is of the order of 3500 pounds per square inch.

Upon the introduction of live steam into the tubing 21, the temperature of the interior of the chamber, and thus the rubber mix, rises rapidly to the vulcanizing temperature B', and the pressure of the nitrogen gas, introduced correspondingly, rises to a pressure of 5,000 pounds per square inch.

At this point, the temperature of the rubber mix is maintained at a constant value, and since the heat absorption of the metallic cylinder is comparatively low, the quantity of steam required in tubing 21 is greatly reduced compared with prior devices.

Since the comparatively high temperatures are reached in a short time, as illustrated in Figure 5, the point at which vulcanization begins is clearly predictable, and hence, the vulcanizing time may be measured from point B'.

After the vulcanization is complete at point C', that is, after the temperature has been maintained at that required for vulcanization for the necessary period of time, the temperature within the chamber is lowered by the introduction of cooling water into the tubing 21. The cooling water absorbs heat from the interior of the chamber, and since the chamber wall 11 has not absorbed a substantial quantity of heat, the cooling cycle is as rapid as the heating cycle between points A' and B'.

Thus, within the comparatively short time between C' and D', the temperature within the vulcanizer is reduced to room temperature, and the heat cycle is complete. From this point on, the expansion of the rubber is carried out in conventional manner. That is, the gas pressure of 3500 pounds per square inch is released to permit the full expansion of occluded gases.

Thus, a considerable saving of time is effected by the utilization of a vulcanizer having surfaces treated so that the heat is concentrated towards the interior thereof. In addition, it may be seen that the vulcanization time may be more accurately controlled within a vulcanizer of the novel type which I have described, and thus, the products obtained from repeated gassing cycles will be more uniform insofar as proper cure is concerned. The curve of Figure 5 shows little more than half an hour for heating and cooling the chamber as compared with three hours for prior devices. The time for the entire cycle (curing time which remains unchanged and heating and cooling time) is cut in half.

The wall of the autoclave 11 is thus prevented from absorbing an excessive amount of heat. This is a distinct advantage since the immediate cooling of a vessel having absorbed a great amount of heat (said vessel at the same time containing a high pressure gas) is not beneficial to the vessel, and any attempt to minimize danger in this respect and promote safety is an additional advantage.

Thus it may be seen that by the utilization of heat directing surfaces in a gassing chamber, the efficiency of the gassing cycle will be increased. It is obvious that these reflecting surfaces may assume various forms and that various metals or other chemical compositions may be employed for these surfaces.

Thus I prefer not to be bound by the specific disclosure hereinabove set forth but by the scope of the appended claims.

I claim:

1. A gassing chamber for treating materials under high gas pressure, having a metallic wall and internal heating elements surrounding an inner working space; a thermally reflective surface between said heating elements and said metallic wall, said heating elements including a heating coil; the said coil having a high heat radiating surface on the side towards said inner working space, and a thermally reflective surface on the side toward said metallic wall.

2. A gassing chamber for treating materials under high gas pressure, having a metallic wall and internal heating elements surrounding an inner working space; a thermally reflective surface between said heating elements and said metallic wall, said heating elements including a heating coil; said coil having a high heat radiating blackened surface on the side toward said inner working space, and a thermally reflective surface on the side toward said metallic wall.

3. A gassing chamber for treating materials under high gas pressure, having a metallic wall and internal heating elements surrounding an inner working space; a thermally reflective surface between said heating elements and said metallic wall, said heating elements including a heating coil; the surface of said coil having a high heat radiating surface on the side toward said inner working space, and a silvered surface on the side toward said metallic wall.

4. A gassing chamber for treating materials under high gas pressure, having a metallic wall and internal heating elements surrounding an inner working space; a thermally reflective surface between said heating elements and said metallic wall, said heating elements including a heating coil; the surface of said coil having a high heat radiating blackened surface on the side toward said inner working space, and a silvered surface on the side toward said metallic wall.

5. A gassing chamber for treating materials under high gas pressure, having a corrugated metallic wall and internal heating elements surrounding an inner working space; a thermally reflective surface between said heating elements and said metallic wall, said heating elements including a heating coil; the said coil having a high heat radiating surface on the side toward said inner working space, and a silvered surface on the side toward said metallic wall.

HANS PFLEUMER.